United States Patent
Mehra

(10) Patent No.: US 8,635,250 B2
(45) Date of Patent: Jan. 21, 2014

(54) METHODS AND SYSTEMS FOR DELETING LARGE AMOUNTS OF DATA FROM A MULTITENANT DATABASE

(76) Inventor: Vinod Mehra, Pleasanton, CA (US)

(*) Notice: Subject to any disclaimer, the term of this patent is extended or adjusted under 35 U.S.C. 154(b) by 261 days.

(21) Appl. No.: 13/094,745

(22) Filed: Apr. 26, 2011

(65) Prior Publication Data

US 2011/0264704 A1 Oct. 27, 2011

Related U.S. Application Data

(60) Provisional application No. 61/327,992, filed on Apr. 26, 2010.

(51) Int. Cl.
*G06F 17/30* (2006.01)

(52) U.S. Cl.
USPC .......................................................... 707/802

(58) Field of Classification Search
USPC .......................................................... 707/802
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |

(Continued)

*Primary Examiner* — Huawen Peng
(74) *Attorney, Agent, or Firm* — Blakely, Sokoloff, Taylor & Zafman, LLP

(57) ABSTRACT

A bulk delete for remote database access is provided. A delete request is received over an API for a multitenant database. The delete can be for either a soft delete or a hard delete, where hard delete allows the system to skip use of a recycle bin. Multiple batch jobs are created to implement the delete request, and the batch jobs are executed asynchronously with respect to the request until the request is satisfied. Results for each batch job can be stored and provided to a client to indicate results of the delete operation.

16 Claims, 6 Drawing Sheets

(56) References Cited

U.S. PATENT DOCUMENTS

| | | |
|---|---|---|
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0078370 A1* | 4/2004 | Acree et al. ............... 707/8 |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0283478 A1* | 12/2005 | Choi et al. ............... 707/9 |

* cited by examiner

METHODS AND SYSTEMS FOR DELETING LARGE AMOUNTS OF DATA FROM A MULTITENANT DATABASE

RELATED CASES

This application claims the benefit of priority of U.S. Provisional Patent Application No. 61/327,992, filed Apr. 26, 2010, which is incorporated herein by reference.

FIELD

Embodiments described are related generally to database management, and embodiments described are more particularly related to deleting large amounts of data from a multitenant database.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright©2011, Salesforce.com Inc., All Rights Reserved.

BACKGROUND

In many conventional database systems, users access their data resources in one logical database, from a user's own systems. Access to a database consumes system resources, as the database system must process and respond to requests as well as accessing storage to read, write, and/or delete data. Deleting records or entries from a database has traditionally been done by identifying records for deletion and executing a request for deletion of one or more of the identified records at a time. While manual deleting may be adequate for small numbers of records to delete, there are significant disadvantages to such an approach when dealing with larger numbers of records, especially when using remote database access.

Deleting large numbers of records could be handled by making a large request to delete the large number of records all from one request. However, performing a large delete would require a significant number of resources to implement the delete operation. For example, there may be a significant burden on the database system to make available the network bandwidth, processing resources, process threads, database connections, or other resources necessary to implement the delete request.

Another approach to deleting a large number of records would be by generating many requests. However, dealing with generating numerous requests is time consuming both to generate, as well as to perform. There is also not generally a good way of knowing when would be a good time to issue requests or not, and thus the issues of resource consumption made above would still be a problem with generating multiple requests instead of a single large request.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
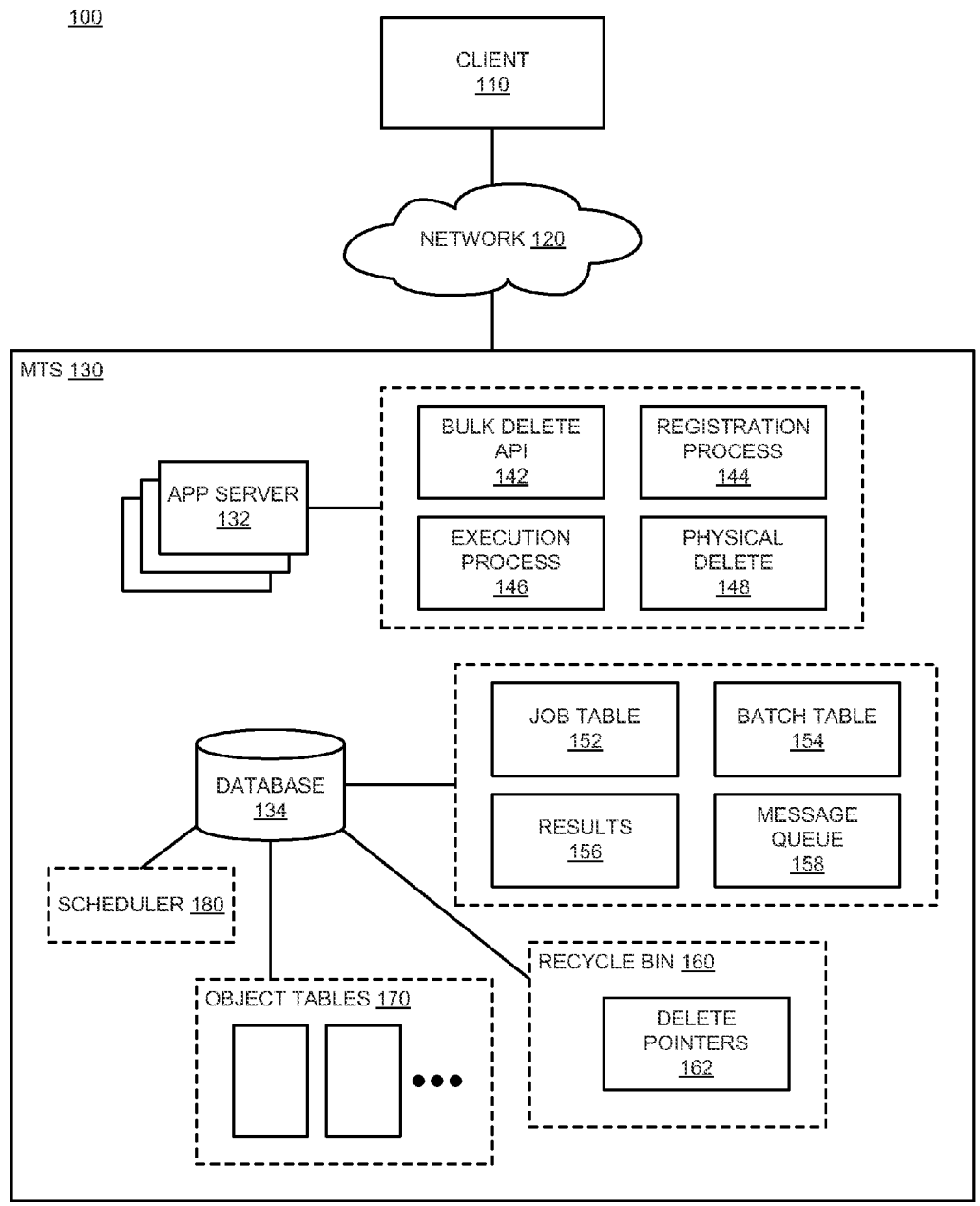
FIG. 1 is a block diagram of an embodiment of an environment with bulk delete capability for a multitenant database.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, a bulk delete is provided for either soft delete or hard delete in a multitenant database system (MTS). The MTS is accessed remotely by a client, and can provide a hulk delete through a web services API (application program interface). For either the soft or hard delete cases, multiple batch jobs are generated to fulfill the delete request. In one embodiment, the batch jobs are executed under a delete job generated to execute the delete request. The batch jobs are executed asynchronously with respect to the request from the client.

The bulk delete API (or APIs if both soft and hard delete APIs are provided) allows a client to make a single request for all requested deletes. Thus, the delete as described herein provides the simplicity of not having to generate multiple requests. The breaking of single request into multiple batch jobs within the MTS allows the request to be executed in the sys in smaller portions, which provides better resource sharing in the MTS.

As referred to herein, a multitenant database stores data for multiple client organizations, which are each identified by a tenant ID. An MTS is a database system with a multitenant database. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. An MTS as described herein can be said to provide on-demand database services. An MTS is typically a hosted system that provides as much database storage and service as required by each tenant.

It will be understood that because multiple tenants share the database system resources (e.g., processing, network bandwidth, process threads, database connections, memory, storage), breaking a single delete request into multiple, smaller jobs can prevent a single tenant from monopolizing the system resources. Instead, batch jobs can be executed by tenant ID as the system has available resources and scheduling space for the tenant.

Contrast the delete provided herein with traditional SOAP (simple object access protocol) APIs used for delete in remote database access. Traditional SOAP APIs are synchronous, which means they will tie up database system resources until the delete operation is completed. Thus, consider the example of a multitenant system with 1000 records to delete in a delete request. There will be a significant delay to execute the deletion of the 1000 records. The result would be one tenant consuming system resources for the entire deletion process. As described herein, performing the bulk delete operations asynchronously in smaller chunks allows each tenant to appropriately "get in line" for system resources, while still being able to accomplish a hulk operation efficiently for the end user.

FIG. 1 is a block diagram of an embodiment of an environment with bulk delete capability for a multitenant database. Environment 100 allows on-demand database services to client 110 from MTS 130 over network 120. Client 110 represents any type of user device or client device, such as any type of computing device (e.g., desktop, laptop, handheld, mobile phones or other mobile devices), through which a user client accesses MTS 130. Network 120 includes any form of network through which the client device of client 110 can access remote MTS 130. Network 120 includes transmission hardware and lines, processing equipment, and appropriate software systems as is understood in the art.

MTS 130 represents a remote database system that provides on-demand database service to client 110. Application (app) server 132 represents a server of MTS 130, and may receive and process queries and/or delete requests from client 110. It will be understood that application server 132 could be one of many (e.g., a pool or a coordinated group of) application servers. Application server 132 processes the delete requests discussed herein, including executing the delete operations. In one embodiment, more than one application server 132 executes delete operations for a single delete request, and may all, for example, reference the same delete job to associate the operations with the delete job that satisfies the delete request.

Database 134 includes the hardware storage resources, and software components that execute on processing resources to enable access to the data. A database may be considered a structured approach to storing and accessing data stored in storage resources (such as implementing a relational model, object oriented model, or an object-relational model for data storage). There are many different implementations of a database, and the specific implementation is not relevant to the discussion herein. The database system includes the storage and processing resources, including interface hardware and software (such as physical network connections, network protocol stacks, security elements, and other components for interfacing with the stored data).

In environment 100, the elements within the dashed box connected to application server 132 represent elements that may be part of application server 132. Similarly, the various elements in the respective dashed boxes connected to database 134 represent elements that may be part of database 134. It will be understood that other elements could be used, and the elements shown represent functionality that may be implemented in the application server or the database of MTS 130.

In one embodiment, applications server 132 includes bulk delete API (application program interface) 142, registration process 144, execution process 146, and physical delete process 148.

API 142 represents a callable mechanism that a user of client 110 can invoke (either manually or through an application executing on client 110 or on MTS 130) to implement a bulk delete. The bulk delete is described herein as a mechanism that allows the user to specify (e.g., in a file with the request) multiple entries or records to be deleted. In one embodiment, API 142 is available via a web service to client 110. Thus, client 110 may access MTS 130 via a browser and generate delete requests through a web service triggers API 142 within MTS 130.

In one embodiment, invoking API 142 is a protected operation. Thus, a user profile perm (configuration value) identifies which users within a company can use the API. Users within a company are users associated within a tenant ID within MTS 130. In one embodiment, the configuration value may be off by default, and should be enabled to allow a user profile to include access to the API.

In one embodiment, registration process 144 registers a delete job with scheduler 180 of database 134. Scheduler 180 provides scheduling services for operations executed on database 134. Registering a process with scheduler 180 provides an identifier to recognize an individual job with the scheduler. In one embodiment, registering a delete job allows MTS 130 to split the job into multiple batch jobs, and potentially across multiple application servers 132, all associated with the registered delete job. Thus, multiple batch deletes, each implementing a delete operation for one or more entries, can all execute tinder a single registered delete job Execution process 146 represents the execution resources of application server 132 to execute one or more batch jobs to implement the delete job to respond to the bulk delete request. In one embodiment, application server 132 includes physical delete process 148 separate from other delete processes used to respond to user requests. Thus, a user may request a delete, but not have any direct access to physical delete 148. Rather, physical delete 148 could be completely controlled by the system. Physical delete 148 can be executed in response to execution of a requested delete, or could simply be run on a schedule.

As described above, physical delete 148 is a process to make hardware resources available within MTS 130. Soft delete marks entries as deleted, but they are still accessible and could be undeleted. Hard delete prevents undeletion, and removes the entries from a filesystem or registry of the database. Physical delete 148 reallocates physical storage resources that are available.

In one embodiment, database 134 includes job table 152, which represents a table of pending jobs that request access to the database. Job table 152 may be limited to registered jobs, whereas pending access requests are placed in an execution queue. Similarly, batch table 154 allows database 134 to monitor and manage batch jobs, and associate the results of the batch jobs back to any jobs of job table 152 that they may be associated with.

Results 156 represent delete results generated by delete jobs and batch jobs executed within database 134. As discussed above, results can be combined for the various batch jobs and sent to indicate the complete delete job results. Thus, results can be generated and stored for each batch job until the entire delete job is completed. Message queue 158 represents any mechanism used to combine the results of the various related delete batch jobs created to execute the requested bulk delete. In one embodiment, multiple results are stored together and returned as a group to indicate the operations performed in response to the delete request.

In one embodiment, database 134 includes recycle bin 160. Recycle bin 160 may be a virtual representation of records that are soft deleted. In one embodiment, recycle bin 160 is a storage of delete events that have been executed, and includes pointers to affected database entries. In one embodiment, soft delete is a default delete method in the system. Soft deleted records count towards storage space against the tenant organization, and may result in a performance hit.

A hard delete can be seen as a method of delete that effectively skips recycle bin 160, and makes the specified records immediately eligible for physical delete. Thus, physical delete 148 can clean up the deleted records the next time it runs. The ability to skip recycle bin 160 while deleting a large amount of data using a bulk delete API 142 may provide a more efficient, better user experience. In one embodiment, the events in the recycle bin expire after 45 days; but it will be understood that other intervals may also or alternatively be supported.

In one embodiment, when physical delete 148 runs, it checks whether the deleted records have an event in recycle bin 160 or not. If no event is found in the recycle bin, the deleted records are physically deleted. Thus, in one embodiment, soft deleted records would normally stay in database 134 for 45+ days (the 45 days being the time to expire, and the '+' being the time until the physical delete process runs the next time after expiration of the records).

In one embodiment, recycle bin 160 is implemented more "virtually", with each entry or record including a field that indicates its status as soft deleted or hard deleted. Thus, a recycle bin storage may not be required, and the physical delete executes as a database process in the background, such as a garbage collector or crawler.

In one embodiment, database 134 consists of multiple object tables 170, which include the records or entries discussed herein. As suggested above, in one embodiment, in one embodiment recycle bin 160 includes delete pointers 162, which represent delete "events" pointing to specific elements of object tables 170. Delete pointers 162 could also point to elements of database 134 even assuming the storage was not organized as object tables 170.

While specific reference is made above to FIG. 1, in general, as implemented herein, bulk delete is provided for allow deletion of large amounts of data from an on-demand database environment.

Thus, it will be understood that a bulk delete API as described herein has a different architecture compared to previous delete mechanisms, storing a job, and asynchronously executing it in pieces as resources become available. In one embodiment, a user provides the multiple identified records or entries for deletion in a CSV (character-separated value) file or XML (extensible markup language) file. The individual batch jobs can delete a portion of the IDs specified in such a request file.

As suggested above, bulk delete APIs can be provided for either 'soft' delete, 'hard' delete, or both. Stated simply, soft delete leaves the record in the database, and allows for a process to 'undelete' a deleted entry. Hard delete, by contrast, does not allow undelete. Different mechanisms for soft delete can be performed, including but not limited to creating a deleted pointer, moving the records to a specific location, changing a field within an entry to indicate the record is deleted, or some other mechanism.

In one embodiment, hard delete does not itself remove content, but merely flags entries for deletion. In one embodiment, a system with a soft delete process also includes a physical delete process. Physical delete refers to operations on the storage space to removing the data from the system, which frees up the storage space previously occupied by the entry. Hard delete can be implemented as a physical delete process, or as a process that marks entries for removal by the physical delete process the next time it is run. Thus, a soft deleted entry may be valid for a threshold amount of time (e.g., 45 days, 90 days) prior to being invalid and physically deleted from the system, and a hard deleted entry is invalid immediately.

It will be understood that the freeing up of storage space can be delayed significantly compared to hard delete (up to several weeks, depending on how soft delete thresholds are implemented). There are certain queries in database implementations that cause the system to hit the database to access soft deleted entries to respond to the query. Thus, in addition to not freeing up storage space (at least not immediately), soft delete may leave entries in the system that will decrease system efficiency for certain queries. In contrast, hard delete eliminates the entry, and thus prevents the entry from being available for access by queries. Thus, the overall efficiency of the system can be improved by use of hard delete.

It will be understood that hard delete may not make the delete operation itself any faster. Rather, the hard delete allows saving on storage space and avoid future performance degradation from large amounts of soft deleted data. However, a bulk delete API operation is very fast compared to other API operations. Additionally, in one embodiment, the database system load balances among multiple application servers to implement the multiple batch jobs. Use of a single delete job does not allow such load balancing. The use of multiple servers can further increase the speed of the bulk delete operation, assuming resources are available among multiple application servers.

In one embodiment, the processing of a delete query is still synchronous, but the amount of processing required is greatly reduced. Thus, a bulk delete query can be stored and acknowledged synchronously, while generating and executing batch jobs is asynchronous with respect to the query. Additionally, providing results to the client to indicate the state of the bulk delete operation cannot be synchronous with respect to the request if the execution of operations to produce the results is asynchronous. In one embodiment, a client polls the database system to request results. For example, a request acknowledgement could return a handle or other identifier that will be used by the client to request results of the bulk delete. Alternatively, the database system can push the results to the client, either based on a schedule, as each batch job finishes, or when the entire delete job is completed.

Figure 2:
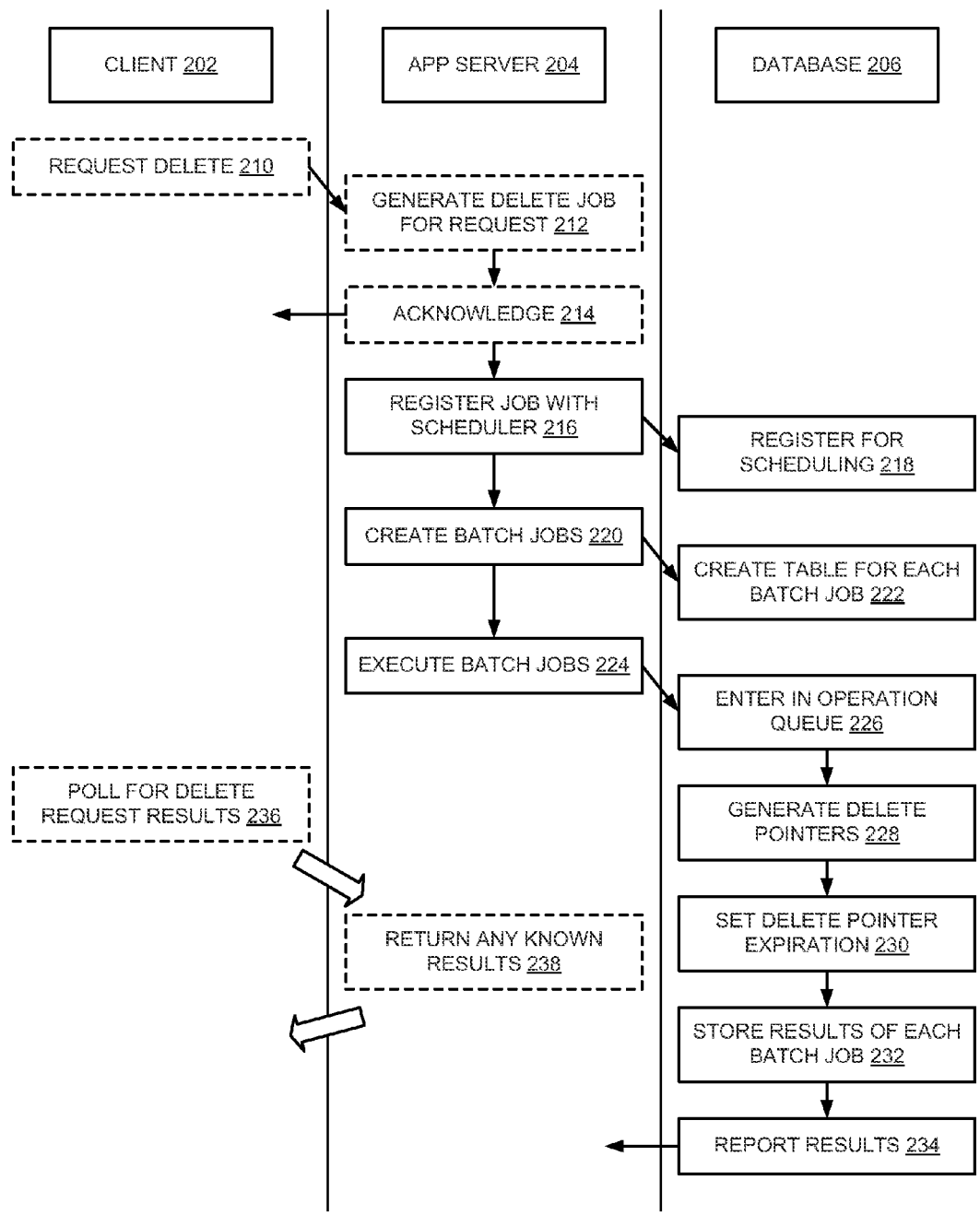
FIG. 2 is a swim lane diagram of an embodiment of a delete request with asynchronous execution.

FIG. 2 is a swim lane diagram of an embodiment of a delete request with asynchronous execution. Client 202 makes a bulk delete request, which is received and processed by application server 204, and executed on database 206. It will be observed that certain operation blocks in FIG. 2 are dashed, while others are solid. The solid line blocks represent operations that are executed asynchronously in response to a delete request from client 202. The dashed line blocks indicate synchronous exchanges.

Client 202 requests a delete, 210, for example, through a bulk delete available over a web services connection with a database system. In one embodiment, the delete request identifies the database entries for deletion, as well as a tenant identifier associated with client 202. Application server 204 receives the request and generates a delete job for the request, 212. The delete job created is for deletion of all entries identified in the delete request.

Application server 204 acknowledges the request synchronously, 214, for example by sending an acknowledgement response to client 202. While the request may be received and acknowledged synchronously, the execution of the delete is asynchronous. In one embodiment, application server 204 registers the generated delete job with a database scheduler, 216. Database 206 through its scheduler may then register the job for scheduling, 218. As shown above with respect to FIG. 1, the database may enter the job in a job table.

The application server further creates multiple batch jobs, 220, to execute the delete job. In one embodiment, each batch job is identified to database 206, which creates a table for each batch job, 222. The table can provide a process space for the batch job, as well as a space to store results. Application server 204 executes the batch jobs, 224. The execution may be performed across multiple application server instances, each referencing a corresponding batch job and table.

In one embodiment, the executed operations are sent to database 206, which enters the operations in an operation queue, 226. Delete operations may result in marking a 'deleted' field as being deleted (e.g., setting a bit to '1'). Additionally, in one embodiment, database 206 generates a delete pointer for each deleted entry, and adds an entry in a recycle bin, 228. In one embodiment, the database sets a delete pointer expiration, 230, for the created delete pointers. Each batch job results is stored, 232, and the results are reported, 234, to application server 204. The results may be pushed or requested.

At any time after the delete request has been acknowledged, client 202 may request status of the delete job. Thus, client 202 may poll the application server (the MTS) for delete request results, 236. The application server could then return any known results, 238, to the client. The polling and responding can continue until the delete job is completed.

Figure 3:
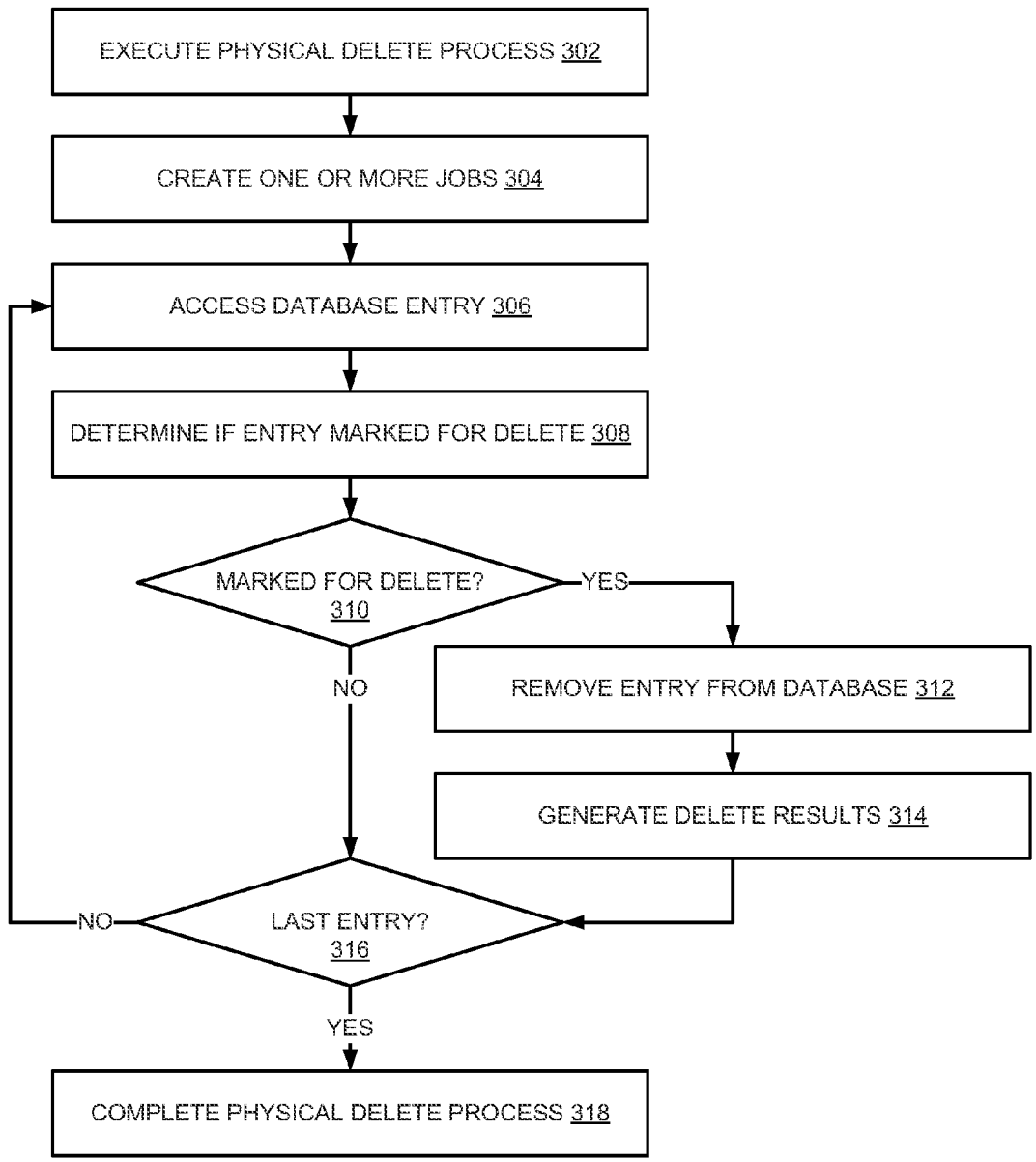
FIG. 3 represents a flow diagram of an embodiment of execution of a physical delete process.

FIG. 3 represents a flow diagram of an embodiment of execution of a physical delete process. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

As referenced above, physical delete may be a process that is executed separately from soft or hard delete. The system determines to execute the physical delete process, 302. Such a determination to execute the physical delete process could be made in response to timing (e.g., a scheduled process), in conjunction with or in response to execution of a soft or hard delete process, or in response to a request by an administrator.

The physical delete process may be executed as one or more jobs, 304, on one or more application servers. The physical delete process may be a process owned by control logic of the database itself. In one embodiment, the physical delete process accesses a database entry, 306, and determines if the entry is marked for delete, 308. The determination may include checking a recycle bin for a delete event in the case where a recycle bin is implemented.

If the entry is not marked for delete, 310, the system determines if the entry is the last entry to access for the process, 316, and if not, it moves to the next entry and access the next database entry, 306. If the entry is the last entry, 316, the system completes the physical delete process, 318, and awaits the next time the process should be executed again.

If the entry is marked for delete, 310, the system removes the entry from the database, 312 (i.e., it physically deletes the entry), and generates a delete result, 314. It is possible that for some reason or other the deletion of the entry does not complete successfully, in which case the result would indicate the failure of the delete instead of the successful deletion. The results may be pushed to another process, or simply stored to await a request for the results.

The system can then determine if the entry is the last entry to check for physical deletion, 316, and either move to the next entry, 306, or complete the process, 318.

Figure 4:
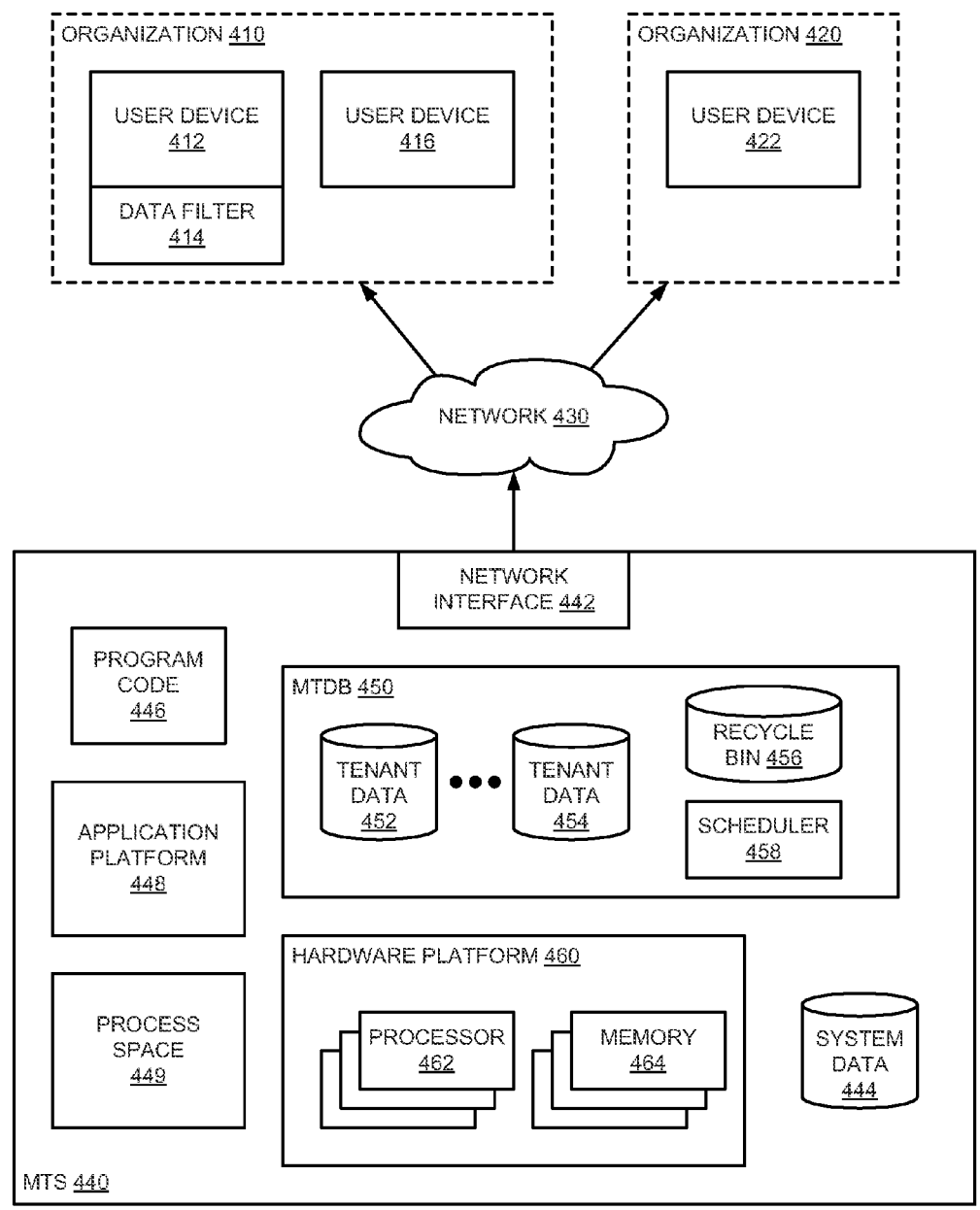
FIG. 4 is a block diagram of an embodiment of an environment for on-demand database services.

FIG. 4 is a block diagram of an embodiment of an environment for on-demand database services. Environment 400 includes components related to an on-demand database service. Environment 400 includes multitenant database system (MTS) 440 and one or more organizations 410 and 420, which are tenants of the MTS. Each organization can include one or more users and/or user devices.

MTS 440 provides on-demand database services for environment 400. An on-demand database service, such provided by MTS 440, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 440 stores information from one or more tenants into tables of a common database image or multitenant database (MTDB) 450. Accordingly, MTS 440 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 450 includes tenant data 452, . . . , 454. The tenant data may be divided into different storage areas, which can be a physical and/or a logical arrangement of data. In one embodiment, multitenant database 450 is accessed via a relational database management system (RDBMS) or the equivalent, which executes storage and retrieval of information against the database object(s). In one embodiment, multitenant database 450 is accessed via an object-oriented database management system (OODBMS) or the equivalent. In one embodiment, multitenant database 450 is accessed via an Object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 448 represents a framework that allows applications of MTS 440 to execute. Thus, application platform 448 includes the software components (such as an operating system) to allow execution of the applications. Hardware platform 460 provides hardware resources to enable the applications to execute on application platform 448, as well as enabling execution of management or control logic for MTS 440. In one embodiment, application platform 448 of MTS 440 enables creation, managing, and executing one or more applications developed by the provider of the on-demand database service, users accessing the on-demand database service via network 430, or third party application developers accessing the on-demand database service via network 430.

MTS 440 represents any type of system that may provide on-demand database service. In addition to application platform 448 and hardware platform 460, which includes processor resources 462 and memory resources 464, MTS 440 may include other components. MTS 440 includes network interface 442 to enable user devices to access MTS 440 over network 430. In one embodiment, MTS 440 includes system data 444, program code 446, and process space 449. System data 444 represents data specific to the running of MTS 440, rather than being tenant data. It is logically separated from the tenant storage, and may be physically separated (e.g., by designating storage areas or address ranges for system data). Program code 446 represents code to implement various functions of MTS 440, which enable the system to provide on-demand database service. Process space 449 represents a framework for executing MTS processes and tenant-specific processes, such as running applications as part of an application hosting service. Additional processes that may execute on MTS 440 include database indexing processes. It will be understood that MTS 440 may include more or fewer components than what is illustrated.

As mentioned above, environment 400 includes organizations 410 and 420, which represent tenants of MTS 440. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 440. Each tenant ID could have certain associated properties for use, depending on how the organization is configured. User device 422 is associated with organization 420, and access MTS 440 under the tenant ID of organization 420. Similarly, user devices 412 and 416 are associated with organization 410, and access MTS 440 under the tenants ID assigned to organization 410.

User devices 412, 416, and 422 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 440 via network 430.

Within an organization, users may be further given access privileges and/or restrictions, as illustrated by data filter 414. As illustrated, user device 416 may access MTS 440 in accordance with whatever access is available to organization 410, while user device 412 has additional restrictions applied by data filter 414. In one embodiment, data filter 414 may additionally or alternatively provide specific user interface features for user 412 in accessing data from MTS 440.

The users of user devices 412, 416, and 422 may differ in their respective capacities, and the capacity of a particular user device might be entirely determined by permissions (permission levels) for the current user. For example, where a salesperson is using a particular user device to interact with MTS 440, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 414, which can filter per device and/or could filter for the entire organization (e.g., a central filter as opposed to distributed filtering).

Network 430 represents any network or combination of networks. A network is generically an interconnection of devices that communicate with each other. Network 430 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 412, 416, 422 (and other user devices not shown) communicate with MTS 440 over network 430 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 412 might include an HTTP client commonly referred to as a "browser" for sending and receiving HTTP messages to and from an HTTP server at MTS 440 (not specifically shown, but which could be executed on hardware platform 460). Such an HTTP server might be implemented as the sole network interface between MTS 440 and network 430, but other techniques might be used as well or instead. In one embodiment, the interface between MTS 440 and network 430 includes load sharing functionality, such as round-robin HTTP request distributors to balance loads and distribute incoming HTTP requests evenly over a plurality of servers. At least as for the users that are accessing that server, each of the plurality of servers has access to data in MTS 440; however, other alternative configurations may be used instead.

In one embodiment, MTS 440 implements a web-based customer relationship management (CRM) system. For example, in one embodiment, MTS 440 includes application servers configured to implement and execute CRM software applications as well as provide related data, code, forms, webpages and other information to and from user devices (e.g., 412, 416, 422) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 440 implements applications other than or in addition to a CRM application. For example, MTS 440 may provide tenant access to multiple hosted (standard and custom) applications, including CRM application. User (or third party developer) applications, which may or may not include CRM, may be supported by application platform 448, which manages creation, storage of the applications into one or more database objects and executing of the applications in a virtual machine in process space 449 of MTS 440.

In one embodiment, MTS 440 is configured to provide webpages, forms, applications, data and media content to user (client) device to support the access by user devices as tenants of MTS 440. In one embodiment, MTS 440 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

In one embodiment, multitenant database 450 includes recycle bin 456 and/or scheduler 458. The concepts of both the recycle bin and the scheduler are discussed above, and will only be briefly discussed here. Recycle bin 456 can enable multitenant database 450 to generate and store delete events for specified entries to be deleted. Soft deleted entries are maintained "alive" in the database via recycle bin 456 until their delete events expire. Hard deleted events do not need entries in the recycle bin, since they are marked for immediate deletion.

Scheduler 458 represents any mechanism used within the multitenant database to control the execution of operations within multitenant database 450. In a multitenant database it is important to perform scheduling in a way that allows for all tenants to have their proportional use of resources. Certain tenants may have access to more resources by virtue of being larger tenants and/or by contracting for more services. Scheduler 458 may thus access contract or restrictions for the tenants to determine how to allocate resources among the tenants. A delete request is broken into multiple operations, which can be scheduled separately, and in accordance with the proportional scheduling for the tenant they belong to.

Figure 5:
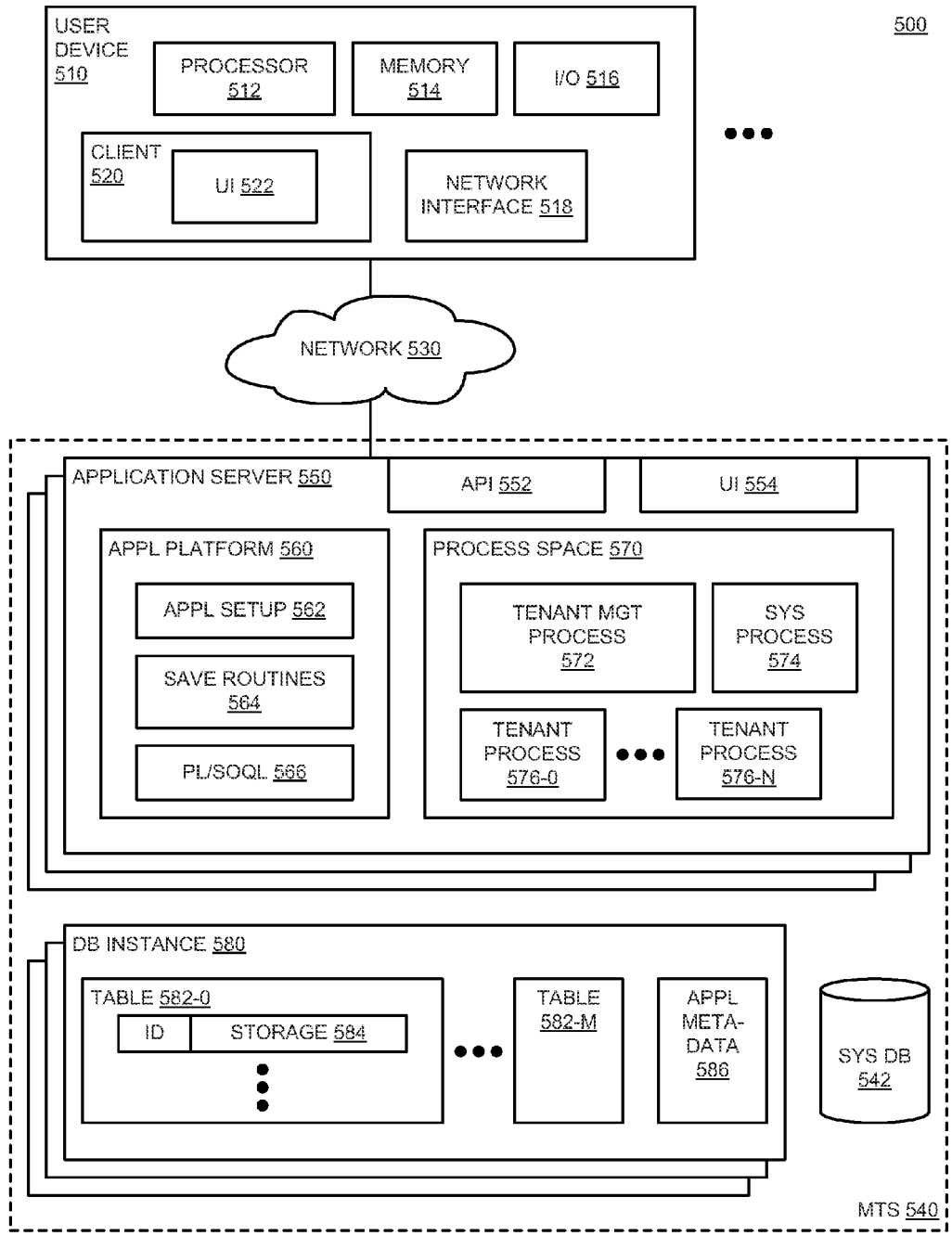
FIG. 5 is a block diagram of an embodiment of an environment for on-demand database services with a multitenant database having multiple data tables.

FIG. 5 is a block diagram of an embodiment of an environment for on-demand database services with a multitenant database having multiple data tables. Environment 500 includes components related to providing an on-demand database service, and may be one example of environment 400 of FIG. 4, with additional components shown. Environment 500 includes one or more multitenant database systems (MTS) 540 and one or more tenants of the MTS, as illustrated by user device 510. User device 510 is generally part of an organization that is the tenant, and user device 510 provides a computing device through which access to MTS 540 is available. MTS 540 provides on-demand database services for environment 500.

Environment 500 may include conventional, well-known elements that are explained only briefly here. For example, user device 510 (and any other user devices through which users access MTS 540) could include a desktop personal computer, workstation, laptop, handheld device, cell phone or smart phone, or any wireless access protocol (WAP) enabled device or any other computing device capable of interfacing directly or indirectly to the Internet or other network connection.

User device 510 includes processor 512, which represents one or more processor devices, and may be any combination of one or more processors. Processor 512 provides hardware means to execute programs and applications on user device 510. Memory 514 represents a memory system for user device 510, and may be any combination of one or more memory devices, short term, and/or tong term memory. I/O (input/output) 516 represents any type of input and output devices such as keyboards, pointers and controllers, touchscreens, buttons, microphones, or other input mechanisms, and monitors, screens, printers, interfaces to networks, and/or other output devices.

User device 510 includes network interface 518, which represents hardware interconnections and control logic and circuitry to enable user device 510 to connect to network 530. Network interface 518 also has associated drivers and possibly other software components to allow user programs to interface with the interconnection hardware. User device 510 includes client 520, which represents a program that allows a user of user device 510 to access information from network 530, such as accessing MTS 540. UI 522 represents a user interface component of client 520, or a user interface in which information from client 520 is presented on user device 510. Thus, UI 522 may be integrated with client 520, or it may be separate from client 520, but display data related to the execution of client 520. UI 522 is rendered on display or user interface hardware or device, which can be understood to be represented by UI 522.

In one embodiment, user device 510 runs an HTTP client as client 520. An HTTP client may be, for example, a browsing program or a browser, which may include a WAP-enabled browser in the case of a cell phone, PDA or other wireless device. The HTTP client allows a user (e.g., subscriber of MTS 540) of user device 510 to access, process, and view information, pages, and applications available from MTS 540 over network 530, based on permissions and privileges. The user interface device of user device 510 can be used to access data and applications hosted by MTS 540, and to perform searches on stored data, and otherwise allow a user to interact with various GUI (graphical user interface) pages that may be presented to a user.

Similar to what is discussed above with reference to network 430 of environment 400, network 530 represents any network or group of networks over which access can be provided to MTS 540. Network 530 may include switching and/or routing elements, cables, connectors, and other components. In one embodiment, at least part of network 530 is the Internet, referring to a specific internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 510 (which may be client systems) communicate with application server 550 to request and update system-level and tenant-level data from MTS 540 that may require sending one or more queries to tenant data storage in database instance 580 and/or system data in system database 542. In one embodiment, MTS 540 (e.g., application server 550) automatically generates one or more SQL statements (e.g., one or more SQL queries) designed to access the desired information. System data storage in system database 542 may generate query plans to access the requested data from database instance 580.

In one embodiment, MTS 540 includes one or more application servers 550. From one perspective, application server 550 can be considered a network interface of MTS 540 to connect to network 530. Application server 550 exchanges (i.e., receives and/or transmits) data with network 530, such as receiving requests and sending replies or sending data. Application servers 550 may share hardware resources for interfacing with network 530, or they may be assigned separate resources. In one embodiment, one or more of application servers 550 can be implemented as an HTTP application server.

In one embodiment, each application server 550 is configured to handle requests for any user associated with any organization that is a tenant. Thus, a request from user device 510 could be received and processed at any application server 550. There may be advantages to avoiding affinity for a user and/or an organization or tenant to a specific application server 550, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 550 and the user devices to distribute requests to the application servers 550. In one embodiment, the load balancer uses a least connections algorithm to route user requests to the application servers 550. Other examples of load balancing algorithms, such as round robin and observed response time, also can be used. For example, in certain embodiments, three consecutive requests from the same user could hit three different application servers 550, and three requests from different users could hit the same application server 550. In this manner, MTS 540 is multitenant, wherein MTS 540 handles storage of, and access to, different objects, data, and applications across disparate users and organizations. In one embodiment, Each application server 550 includes elements to provide database access service and request processing. Application server 550 includes API (application programming interface) 552 and UI 554. UI 554 represents server-side components that provide user interface elements that are provided to user device 510 for display. API 552 provides an interface for users and/or developers to access resident processes of MTS 540.

In one embodiment, application server 550 includes application (appl) platform 560, which provides a sub-environment on which applications hosted by application server 550 can be executed. Application platform 560 may include an operating system or other control logic, as well as business logic and common routines for use by the applications. As illustrated, application platform 560 includes application setup mechanism 562 that supports creation and management of applications, including configuration, by application developers, which may be saved as metadata into tenant data storage of database (db) instance 580. Save routines 564 represent the mechanisms used to store data in database instance 580, such as storing the application setup metadata. Such applications can be executed by subscriber users, for example, in process space 570.

In one embodiment, invocations to or related to such applications may be coded using PL/SOQL (Procedural Language Salesforce Object Query Language) that provides a programming language style interface extension to API 552. Thus, PL/SOQL 566 is capable of serving as a procedural extension to an on-demand database centric service API that allows flow control and transaction control to execute on a server in conjunction with database APIs (e.g., SOQL, data manipulation language (DML), or others). PL/SOQL 566 can enable the capability to thread together multiple SOQL/DML statements as a single unit of work on the server. PL/SOQL 566 need not necessarily be considered a general purpose programming language, seeing that it may be implemented as heavily data focused, but is not necessarily implemented that way. In one embodiment, PL/SOQL 566 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 566 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 566 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, now expired, which is incorporated in its entirety.

In one embodiment, invocations to applications may be detected by one or more system processes, which manage retrieving application metadata 586 for the subscriber making the invocation and executing the metadata as an application in a virtual machine. Metadata 586 provides data related to access and/or use of data stored in database instance 580. In one embodiment, metadata is stored in a separate table within database instance 580, and in an alternative embodiment, metadata 586 is stored with other data elements of user storage (such as with user storage 584 of table 582-0.

In one embodiment, application server 550 includes process space 570, which may include tenant process spaces 576-0 through 576-N (for some integer number N of process spaces configured in application server 550), tenant management process space 572 and system process space 574. It will be understood that process space 570 is an abstraction to illustrate the resources allocated for execution of processes (e.g., programs or applications) within application server 550. The skilled reader recognizes that memory and processor and other hardware resources may need to be allocated, as well as software resources to support the execution of a process. The processes may be executed as separate threads, or may share a thread, in one embodiment, the number N of tenant processes is equal to a number of subscriber tenants. In another embodiment, the number N of tenant processes may be higher than the number of subscriber tenants. Tenant management process 572 provides management of the other processes, including determining when certain processes execute. System process 574 executes operations related to functions of MTS 540.

Each application server 550 may be configured to tenant data storage in database instance 580 and the tenant data stored therein, and to system data storage of system database 542 and the system data stored therein to serve requests of user devices. As mentioned above, in one embodiment, tenant data is separated logically, and stored in the same multitenant database. In one embodiment, database instance 580 stores data in tables 582-0 through 582-M, where M is some integer number of tables. In one embodiment, different tables store data of different types. Application metadata 586 may be implemented as a separate table. Alternatively, one of the tables 582-0 through 582-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 584 may represent either or both of tenant storage or user storage. For example, a copy of a user's most recently used (MRU) items might be stored to in user storage within database instance 580. Similarly, a copy of MRU items for an entire organization that is a tenant might be stored to a tenant storage area of database instance 580. In one embodiment, the tenant data and the system data (as illustrated by system database 542) are stored in separate databases.

Application servers 550 may be communicably coupled to database systems, e.g., having access to system database 542 and tenant database instance 580, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 580, one tenant might be a company that employs a sales force where each salesperson uses MTS 540 to manage their sales process. Thus, a user might maintain contact data, leads data, customer follow-up data, performance data, goals and progress data, and other data, all applicable to that user's personal sales process (e.g., storage 584, which may be tenant storage). Thus, all of the data and the applications to access, view, modify, report, transmit, calculate, or perform other operations can be maintained and accessed via a user device having nothing more than network access. In an example of MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 540 that are allocated at the tenant level while other data structures might be managed at the user level. Because MTS 540 may support multiple tenants including possible competitors, MTS 540 should have security protocols that keep data, applications, and application use separate. Additionally, because many tenants may opt for access to an MTS rather than maintain their own system, redundancy, up-time, and backup are additional functions that may be implemented MTS 540. In addition to user-specific data and tenant specific data, MTS 540 may also maintain system level data usable by multiple tenants or other data. Such system level data might include industry reports, news, postings, and the like that are sharable among tenants.

In one embodiment, each database instance 580 can be viewed as a collection of objects, such as a set of logical tables, containing data fitted into predefined categories, A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multi-tenant database has standard entity tables for use by all tenants. For CRM database applications, such standard entities might include tables for Account, Contact, Lead, and Opportunity data, each containing pre-defined fields. Thus, tables 582-0 through 582-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple tables per organization. It is transparent to customers that their multiple "tables" are in fact stored in one large table or that their data may be stored in the same table as the data of other customers.

Figure 6:
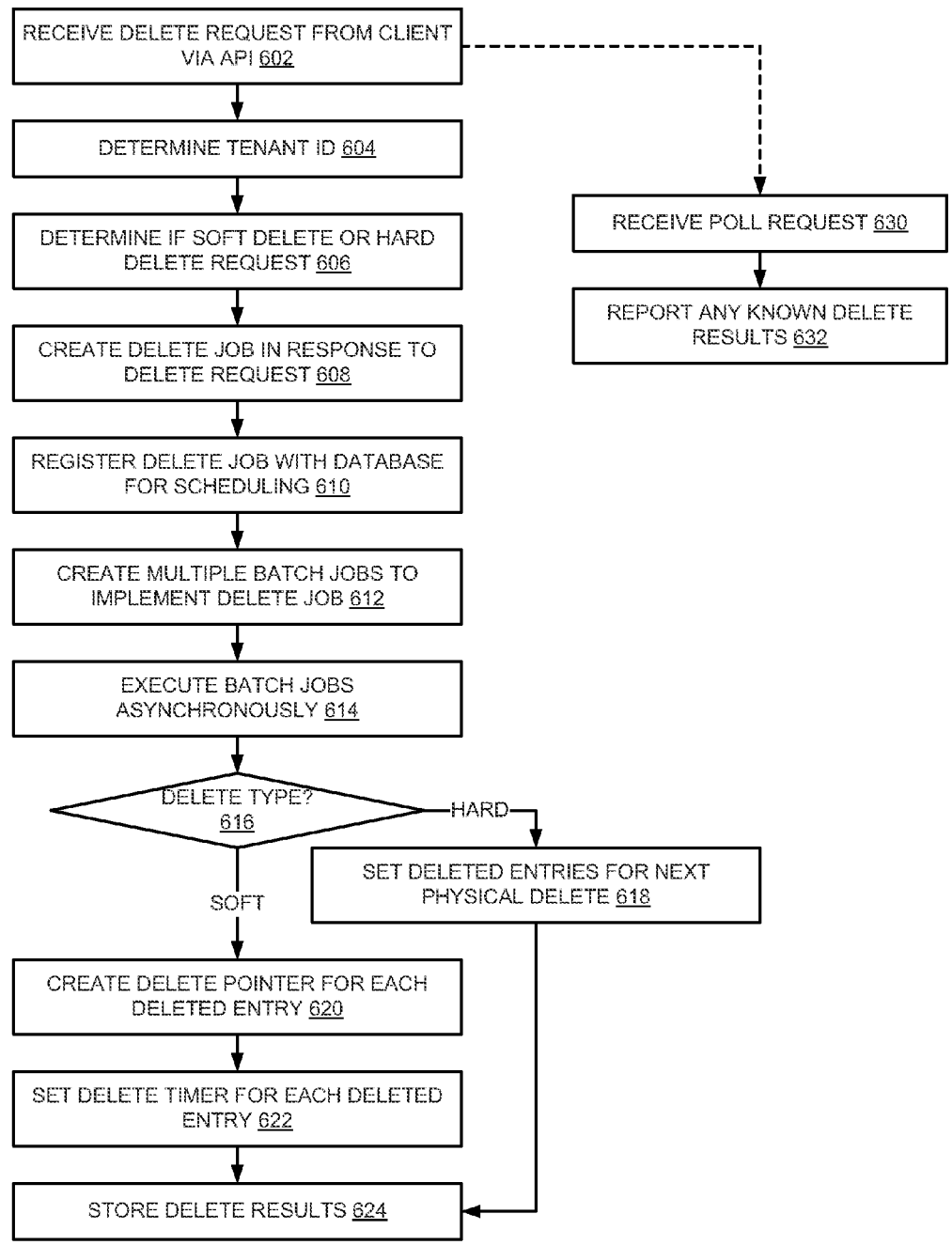
FIG. 6 represents a flow diagram of an embodiment of bulk delete with hard or soft delete processes in a multitenant database.

FIG. 6 represents a flow diagram of an embodiment of bulk delete with hard or soft delete processes in a multitenant database. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

A server of a multitenant database system (MTS) receives a bulk delete request from a client over a network via a delete API, 602. The server may respond synchronously to the request, and then execute the request asynchronously. In one embodiment, the server determines a tenant ID associated with the request, 604. The tenant ID may be a part of every request, or it may be determined by referencing the client ID of the requestor.

The server determines if soft delete or hard delete is requested, 606. In one embodiment, the two different types of delete are identified by separate APIs. Thus, the type of delete is identified by the request. The system determines from the request or otherwise what type of delete will be implemented. Except where identified, the following operations apply to both hard and soft delete. The server creates a delete job in response to the delete request, 608. The delete job has associated with it all the records for which delete are requested in the bulk delete request received. In one embodiment, the delete job is registered with the multitenant database for scheduling, 610.

The server creates multiple batch jobs to implement the delete job, 612. In one embodiment, the size of the batch jobs is predetermined, for example, to delete a certain number (e.g., 50, 100, 200) of records at a time. Thus, the server can simply divide the delete job into batch jobs based on the number of records for which delete is requested. More sophisticated algorithms could be used, for example, by considering a total number of records requested to be deleted, and dividing the delete job into 10 batch jobs for a certain range, 20 for a next range of deletes, and so forth. It will be understood that more complicated algorithms required additional logic to execute.

The server or servers selected for execution of the batch jobs executed the batch jobs asynchronously with respect to the request, 614. The execution of the batch jobs depends upon the delete type. If the delete type is a hard delete, 616, then a hard delete process is executed. It will be understood that a single request will be for hard delete or soft delete of all records identified—there is not a request that performs hard delete on certain records and soft delete on others. For hard delete, in one embodiment, the identified records are set for delete to be eliminated by the next execution of a physical delete process, 618.

For soft delete, 616, in one embodiment the database creates a delete pointer for each deleted entry, 620. In one embodiment, the database sets a delete timer for each deleted entry, 622. The delete timer may be a timestamp of the time of creation of a delete event, or a time value stored and associated with the record to which it corresponds.

Whether for soft delete or hard delete, the database stores the results of each delete operation, 624. The results can be passed back to the client to indicate progress of the delete job.

In one embodiment, a client can poll the MTS for status of the delete job (by identifying the delete request that it sent, or identifying the delete job via an identifier sent in a synchronous acknowledgement). Thus, the server receives a poll request from the client, 630. The server reports any known delete results to the client in response to the request, 632. The server receives the results from the database and can then pass them to the client.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A system comprising:
a multitenant database including hardware and software components to implement a database shared by a plurality of separate and distinct customer organizations,
wherein the multitenant database stores data for multiple client organizations each identified by a tenant identifier (ID) and one or more users are associated with the tenant ID,
wherein the one or more users of each client organization accesses data identified by the tenant ID associated with the respective client organization, and
wherein the multitenant database is hosted by an entity separate from the client organization; and
a server coupled to the multitenant database, the server to receive a delete request from a client at an application server via a web services application program interface (API) in a multitenant database, the delete request to delete multiple entries of the multitenant database, the delete request including a tenant ID to identify a tenant associated with the delete request;
determine whether the delete request is for a soft delete or a hard delete;
create multiple batch jobs to implement a delete job for the determined delete request in response to receiving the request, each batch job to perform a delete operation to delete one or more entries;
register the delete job with a scheduler of the multitenant database, each of the batch jobs to execute under the registered delete job, the scheduler to schedule batch jobs for one or more application servers to implement the delete job;
the multitenant database to further execute the batch jobs on the one or more application servers to execute the delete operations to implement the delete job asynchronously with respect to receiving the delete request, where each application server references the delete job with the multitenant database when it executes its batch jobs; and
receive results for each executed batch job from the database until the delete job is completed.

2. The system of claim 1, wherein the server is a first server, and further comprising:
a second server to execute at least one batch job to implement the delete job;
wherein the first server is to execute the batch jobs at least by sending a batch job to the second server for execution.

3. The system of claim 1, wherein the server determines the request is a soft delete request, and the server is to execute the batch jobs by deleting the entries with a soft delete, where the entries can be undeleted within a threshold amount of time, after which they are automatically physically deleted.

4. The system of claim 1, wherein the server determines the request is a hard delete request, and the server is to execute the batch jobs by deleting the entries with a hard delete, where there is no threshold amount of time where the entries can be undeleted, and the entries are physically deleted at a next execution of a hard delete process.

5. A method comprising:
receiving a delete request from a client at an application server via a web services application program interface (API) in a multitenant database, the delete request to delete multiple entries of the multitenant database, the delete request including a tenant identifier (ID) to identify a tenant associated with the delete request, the tenant being one of multiple client organizations having data stored in the multitenant database;
determining whether the delete request is for a soft delete or a hard delete;
creating multiple batch jobs to implement a delete job for the determined delete request in response to receiving the request, each batch job to perform a delete operation to delete one or more entries;
registering the delete job with a scheduler of the multitenant database, each of the batch jobs to execute under the registered delete job, the scheduler to schedule batch jobs for one or more application servers to implement the delete job;
executing the batch jobs on the one or more application servers to execute the delete operations to implement the delete job asynchronously with respect to receiving the delete request, where each application server references the delete job with the multitenant database when it executes its batch jobs; and
storing results for each executed batch job until the delete job is completed.

6. The method of claim 5, wherein the delete request identifies the multiple entries and a tenant identifier of the multitenant database.

7. The method of claim 5, wherein executing the batch jobs comprises executing at least one batch job on an application server other than the application server that received delete request from the client.

8. The method of claim 5, wherein executing the batch jobs comprises executing at least one of the batch jobs on an application server other than the application server that received the delete request from the client.

9. The method of claim 5, wherein executing the batch jobs further comprises:
deleting the entries with a soft delete, where the entries can be undeleted within a threshold amount of time, after which they are automatically physically deleted.

10. The method of claim 5, where executing the batch jobs further comprises:
deleting the entries with a hard delete, where there is no threshold amount of time where the entries can be undeleted, and the entries are physically deleted at a next execution of a hard delete process.

11. The method of claim 5, further comprising:
providing the results to the client in response to a poll request by the client.

12. An article of manufacture comprising a computer readable storage medium having content stored thereon, which when executed, cause a machine to perform operations including:
receiving a delete request from a client at an application server via a web services application program interface (API) in a multitenant database, the delete request to delete multiple entries of the multitenant database, the delete request including a tenant identifier (ID) to identify a tenant associated with the delete request, the tenant being one of multiple client organizations having data stored in the multitenant database;
determining whether the delete request is for a soft delete or a hard delete;
creating multiple batch jobs to implement a delete job for the determined delete request in response to receiving the request, each batch job to perform a delete operation to delete one or more entries;
registering the delete job with a scheduler of the multitenant database, each of the batch jobs to execute under the registered delete job, the scheduler to schedule batch jobs for one or more application servers to implement the delete job;
executing the batch jobs on the one or more application servers to execute the delete operations to implement the delete job asynchronously with respect to receiving the delete request, where each application server references the delete job with the multitenant database when it executes its batch jobs; and
storing results for each executed batch job until the delete job is completed.

13. The article of manufacture of claim 12, where the content to provide instructions for executing the batch jobs comprises content to provide instructions for executing at least one batch job on an application server other than the application server that received delete request from the client.

14. The article of manufacture of claim 12, wherein the content to provide instructions for executing the batch jobs comprises content to provide instructions for executing at least one of the batch jobs on an application server other than the application server that received the delete request from the client.

15. The article of manufacture of claim 12, wherein the content to provide instructions for executing the batch jobs further comprises content to provide instructions for deleting the entries with a soft delete, where the entries can be undeleted within a threshold amount of time, after which they are automatically physically deleted.

16. The article of manufacture of claim 12, wherein the content to provide instructions for executing the batch jobs further comprises content to provide instructions for deleting the entries with a hard delete, where there is no threshold amount of time where the entries can be undeleted, and the entries are physically deleted at a next execution of a hard delete process.

* * * * *